April 22, 1969

J. C. MELCONIAN 3,439,498

GAS TURBINE ENGINE COMBUSTION CHAMBER

Filed Nov. 13, 1967

United States Patent Office 3,439,498
Patented Apr. 22, 1969

3,439,498
GAS TURBINE ENGINE COMBUSTION CHAMBER
Jerry Chanes Melconian, Derby, England, assignor to Rolls-Royce Limited, Derby, England, a British company
Filed Nov. 13, 1967, Ser. No. 682,304
Claims priority, application Great Britain, Dec. 16, 1966, 56,553/66
Int. Cl. F02c 3/14, 7/12
U.S. Cl. 60—39.37                    4 Claims

ABSTRACT OF THE DISCLOSURE

A gas turbine engine combustion chamber has at least one pair of flame tubes which communicate with one another by way of an intercommunicating duct, the internal wall of each of the intercommunicating ducts being supplied with tangentaially directed jets of cooling air which flow over at least those portions of the said internal wall which are disposed adjacent the respective flame tubes.

---

This invention concerns a gas turbine engine combustion chamber.

According to the present invention, there is provided a gas turbine engine combustion chamber comprising a casing within which are mounted and from which are spaced a plurality of angularly spaced apart flame tubes, at least one pair of flame tubes communicating with one another by way of an intercommunicating duct, and cooling air supply means for supplying the internal wall of each of the intercommunicating ducts with tangentially directed jets of cooling air, the said jets of cooling air flowing over at least those portions of the said internal wall which are disposed adjacent the respective flame tubes.

Preferably the cooling air supply means comprise at least one conduit member for each intercommunicating duct, each conduit member having at least one converging portion to produce a said jet.

Each conduit member may be substantially C-shaped at its downstream end.

The upstream end of each conduit member may be arranged to receive air from the space between the said casing and the flame tubes.

Figure 1:
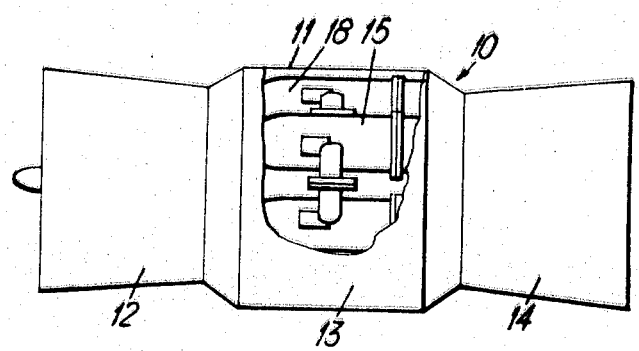
Figure 2:
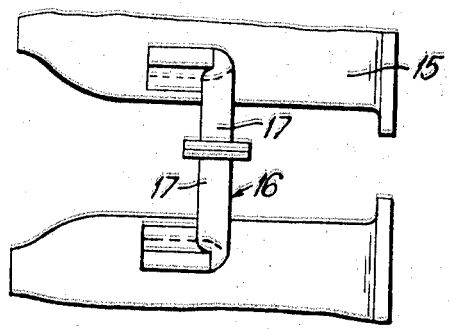
Figure 3:
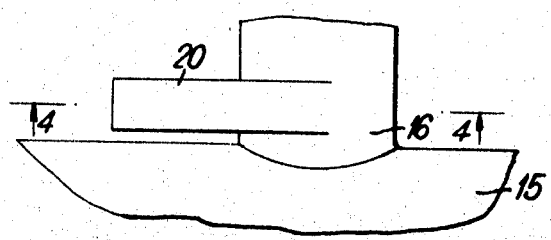
Figure 4:
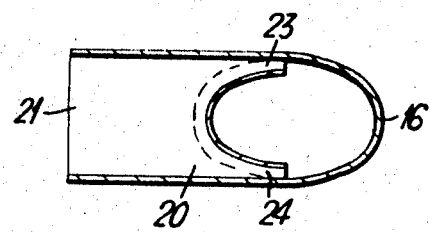
Figure 5:
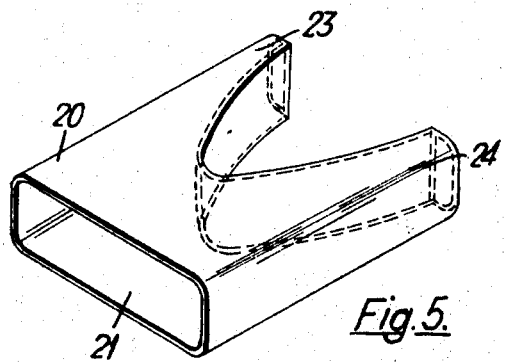

The invention is illustrated, merely by way of example, in the accompanying diagrammatic drawings, in which:

FIGURE 1 is a partly broken away elevation of a gas turbine engine provided with a combustion chamber in accordance with the present invention, FIGURE 2 shows part of the structure of FIGURE 1 on a larger scale, FIGURE 3 is a plan view on a still larger scale of part of the structure shown in FIGURE 2, FIGURE 4 is a section taken on the line 4—4 of FIGURE 3, and FIGURE 5 is a perspective view of a conduit member forming part of the combustion chamber.

In FIGURE 1 there is shown a gas turbine jet propulsion engine 10 having an engine casing 11 within which there are mounted in flow series one or more compressors 12, a combustion chamber 13, and one or more turbines 14.

Mounted within and spaced by a space 18 from the casing 11 of the combustion chamber 13 are a plurality of angularly spaced apart flame tubes 15. Each adjacent pair of flame tubes 15 communicate with each other by way of an intercommunicating duct 16. Each such intercommunicating duct 16 is disposed substantially midway of the length of the respective flame tubes 15 and comprises two stub pipes 17 which are bolted together.

Ignition equipment (not shown) may be provided in one only of the flame tubes 15, the intercommunicating ducts 16 ensuring that once combustion has been initiated in one of the flame tubes 15, ignition of the combustion air/fuel mixture in the remaining flame tubes 15 will rapidly occur.

The regions of the intercommunicating ducts 16 immediately adjacent to the respective flame tubes 15 become, however, very hot in operation and are liable indeed to become burnt out. In order, therefore, to overcome this disadvantage, each of the intercommunicating ducts 16 is provided adjacent each of its ends with a cooling air conduit member 20 which is best seen in FIGURE 5. Each of the conduit members 20 is substantially rectangular in cross-section at its upstream end 21. The said upstream end 21 is arranged to receive air from the space 18 which is itself receiving air from the compressor or compressors 12. Each of the conduit members 20 is substantially C-shaped in plan at its downstream end so as to be provided with two portions 23, 24 of convering cross-section.

The portions 23, 24 of each conduit member 20 are, as best shown in FIGURE 4, inserted into the respective intercommunicating duct 16 so that the cooling air entering the upstream end 21 of the conduit member 20 will be directed as jets which flow tangentially of the inner wall of the intercommunicating duct 16. Those portions of the internal wall of the intercommunicating duct 16 which are disposed adjacent the respective flame tubes 15 will thus be cooled by the jets of cooling air flowing thereover.

I claim:

1. A gas turbine engine combustion chamber comprising a casing, a plurality of angularly spaced apart flame tubes which are mounted within and spaced from said casing, an intercommunicating duct by means of which at least one pair of said flame tubes communicate with one another, and cooling air supply means for supplying the internal wall of the intercommunicating duct with tangentially directed jets of cooling air, the said jets of cooling air flowing over at least those portions of the said internal wall which are disposed adjacent the respective flame tubes.

2. A combustion chamber as claimed in claim 1 in which the cooling air supply means comprise at least one conduit member for the intercommunicating duct, each conduit member having at least one converging portion to produce a said jet.

3. A combustion chamber as claimed in claim 1 in which the conduit member is substantially C-shaped at its downstream end.

4. A combustion chamber as claimed in claim 2 in which the upstream end of the conduit member is arranged to receive air from the space between the said casing and the flame tubes.

References Cited

UNITED STATES PATENTS

| | | | |
|---|---|---|---|
| 2,722,803 | 11/1955 | Travers | 60—39.37 |
| 3,001,366 | 9/1961 | Shutts | 60—39.37 |
| 3,184,918 | 5/1965 | Mulcahey | 60—39.37 |

CARLTON R. CROYLE, Primary Examiner.
DOUGLAS HART, Assistant Examiner.

U.S Cl. X.R.
60—39.66